United States Patent [19]

Nespeta et al.

[11] Patent Number: 5,607,263
[45] Date of Patent: Mar. 4, 1997

[54] CUTTING TOOL

[75] Inventors: Horst Nespeta, Kempten; Alfred Pötzl, Durach; Manfred Simon, Marktoberdorf; Franz Pfob, Probstried, all of Germany

[73] Assignee: Zettl GmbH CNC Prazisions-und Sonderwerkzuege, Reicholzried, Germany

[21] Appl. No.: 513,910

[22] PCT Filed: Apr. 9, 1994

[86] PCT No.: PCT/EP94/01104

§ 371 Date: Sep. 7, 1995

§ 102(e) Date: Sep. 7, 1995

[87] PCT Pub. No.: WO94/23874

PCT Pub. Date: Oct. 27, 1994

[30] Foreign Application Priority Data

Apr. 14, 1993 [DE] Germany .......................... 43 12 216.7
Sep. 11, 1993 [DE] Germany .......................... 43 30 826.0

[51] Int. Cl.[6] .................................. B23C 5/00; B23C 5/26
[52] U.S. Cl. ............................ 407/61; 407/53; 408/227; 408/233
[58] Field of Search ........................ 279/8; 407/40, 407/48, 53, 60, 61; 408/231, 227, 233, 713

[56] References Cited

U.S. PATENT DOCUMENTS

| 2,040,263 | 5/1936 | Layne et al. | 407/40 X |
| 2,912,904 | 11/1959 | Peterson | 407/48 |
| 2,995,963 | 8/1961 | Lavallee | 408/233 |
| 5,026,224 | 6/1991 | Andersson et al. | 279/8 X |
| 5,292,213 | 3/1994 | Massa et al. | 279/8 X |

FOREIGN PATENT DOCUMENTS

| 634110 | 1/1962 | Canada | 408/227 |
| 0188617 | 8/1987 | Japan | 279/8 |

*Primary Examiner*—M. Rachuba
*Assistant Examiner*—Henry W. H. Tsai
*Attorney, Agent, or Firm*—Notaro & Michalos P.C.

[57] ABSTRACT

A cutting tool having a cutting plate with at least one blade and a central axial hole through which a head screw can be used to connect the cutting plate to a holder having an axial bore through its center for receiving the screw and a recess around the bore for receiving a complimentary projection located around the central hole of the cutting plate which is longer than the recess is deep. Alternate embodiments are provided in which the projection is located on the holder and the recess in the face of the cutting plate. In all embodiments, the recess and projection have contacting surfaces which substantially eliminate axial forces on the head screw.

10 Claims, 9 Drawing Sheets

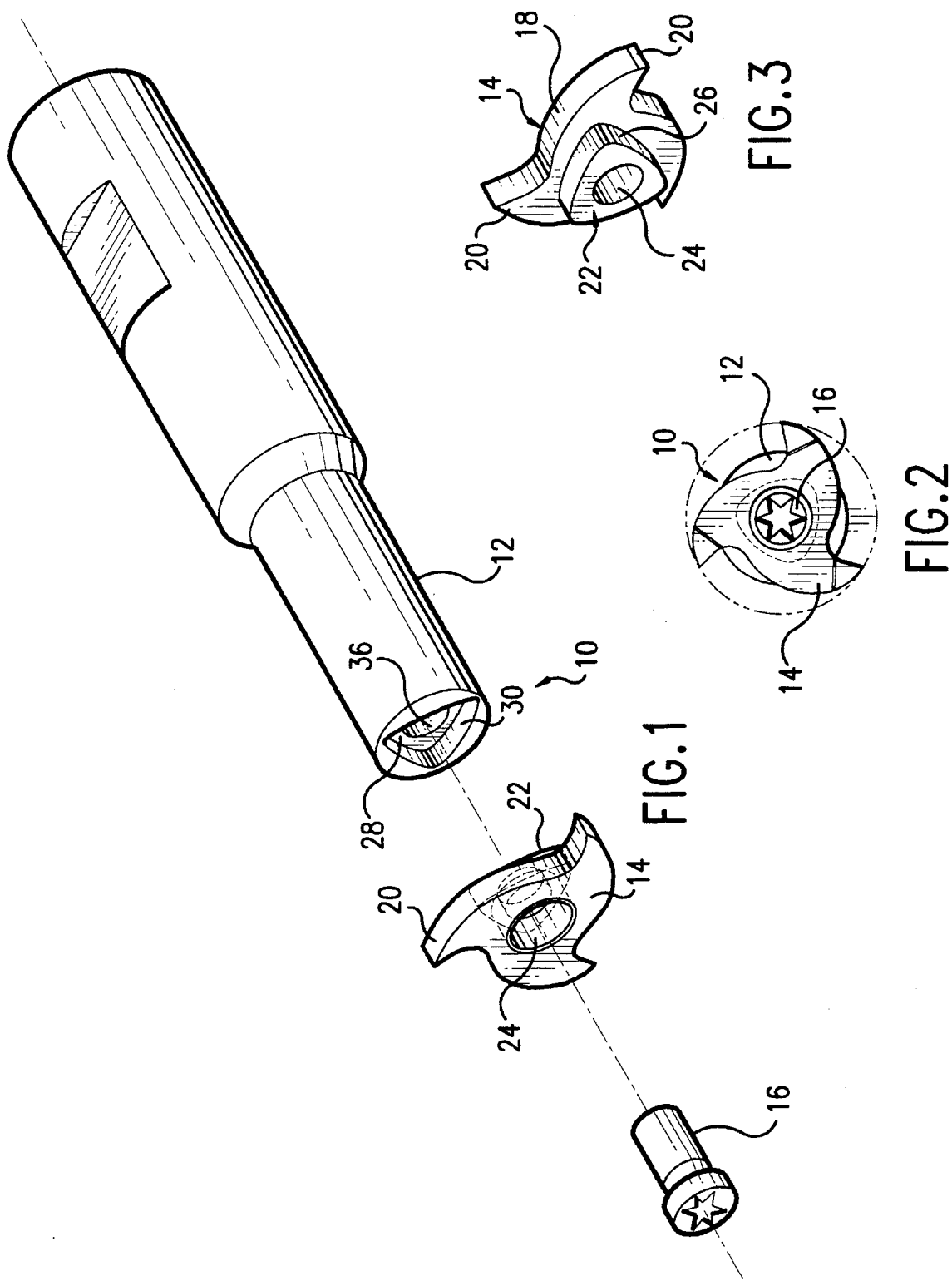

CUTTING TOOL

FIELD AND BACKGROUND OF THE INVENTION

The invention relates to a cutting tool with a cutting plate comprising on its circumference at least one cutting tooth, which has a central through hole terminating on a front face with a hole enlargement and a cylindrical, non circular coupling surface intended for the form-fit contact on a fitting countersurface of a holder, which comprises an axially parallel screw hole and the cutting plate is secured on the holder by screw connection with a head screw penetrating its through hole.

DE-A-31 19 189 shows a cutting tool. The cutting plate has a projection with square contour and is slid into a slit formed between two jaws of the holder. The slit comprises a slide channel for the projection of the cutting plate. The hole enlargement is not located in the cutting plate but rather in one of the jaws of the holder. Two opposing side faces of the projection form the coupling surfaces which, together with the side faces of the insertion channel as countersurfaces, are intended to secure the cutting plate on the holder against rotation. The projection does not prevent the cutting plate from becoming linearly displaced on the holder. A centering function cannot be assumed by the projection with its coupling surfaces. This is the function of the fastening screw.

DE-C-38 16 301 shows a cutting tool in which the cutting plate also has a projection whose side faces represent form-fitting coupling surfaces. In this case the projection has a square or rhomboidal contour and two side faces, abutting each other at an angle, of the projection come into contact over a portion of their lengths with complementary counterfaces of the holder. Here too, centering between cutting plate and holder is absent. The head screw must assume this centering and for that reason is under high load.

DE-C-34 48 086 shows a cutting tool in which on one front face of the cutting plate radial ribs are provided which form-fittingly engage corresponding grooves of the holder. The ribs have a trapezoidal cross section. The cutting plate is centered, however, at high cutting forces the danger of breakage of the ribs exists and the screws and their screw seat in the holder are under high load.

DE-A-40 26 651 shows a cutting tool in which the cutting plate is fastened on the holder by means of a separate coupling bolt. Between cutting plate and holder no direct coupling engagement exists, rather a portion or the through hole is implemented as coupling surface whose contour forms a rounded triangular concave polygon. The holder has at its end an identically contoured coupling surface and the tie bolt has a complementary countersurface whose contour thus forms a triangular convex polygon. For reasons of construction, the cutting plate cannot be fastened on the holder by means of a screw, rather the tie bolt requires a complicated clamping device in a widened head of the holder there is play in the connections between the cutting plate and coupling bolt as well as between the latter and the shaft, the concentricity tolerances are doubled. It would theoretically be conceivable to integrate the cutting plate and the coupling bolt in one piece in order to decrease the tolerances, however, this cutting plate would then be too expensive for use in practice as a wearing part, extremely difficult to handle in technical operations, and production of the cutting plate by sintering technology would be impossible.

EP-B-00 84 607 describes a cutting tool in which the cutting plate has a triangular contour and the front face of the shaft has a recess of complementary form. This cutting tool has proven to be useful in practice, however, with very high cutting performance the danger of breakage exists. Due to the necessary fit tolerance, the cutting plate twists slightly in the plate receiver of the holder and due to the pressure at the edge the projections in the form of chord segments can break off.

SUMMARY OF THE INVENTION

A problem addressed by the invention is implementing a cutting plate for a cutting tool in such a way that between a cutting plate and holder a direct form-fit connection is created which withstands extremely high cutting forces, fully fulfills a centering function and avoids any reaction forces on the head screw.

This problem is solved in the case of a cutting tool with the characteristics of the above given type thereby that the coupling surface has a rounded multicorner convex polygon contour and forms the circumferential surface of a front-face projection of the cutting plate which is implemented integrally with it, such that between the cutting plate and projection a seamless homogeneous structure exists, and that the coupling surface of the cutting plate is encompassed over its entire circumference by the countersurface formed in a front-face recess of the holder. A seamless connection of cutting plate and projection with homogeneous structure means that the structural part is originally formed in one piece and does not comprise two pieces welded, soldered or affixed by adhesion or connected in any other way.

According to an advantageous further development of the invention, the cutting plate with its projection forms a sintered part, preferably in the form of a sintered hard carbide body.

Since the coupling surface on the cutting plate and the complementary countersurface on the holder are each circumferentially closed and have a comparatively large central diameter due to the dimensioning of the projection, the danger of breakage is reduced to a minimum even at high cutting performances. The contour of the coupling surfaces results in self-centering with high accuracy which is even retained during twisting relative to the holder. The reaction moment of the cutting forces is transmitted to the holder in the region of the coupling surface of the cutting plate without the head screw being subjected to axial forces. Since according to an embodiment of the invention the height of the projection is greater than the depth of the front-face recess of the holder, the disk-shaped portion of the cutting plate bearing the teeth is at an axial distance from the holder so that in the event of a break on the cutting plate the plate receiver of the holder is not damaged.

An alternative solution of the problem according to the invention consists therein that the coupling surface has a rounded multicorner concave polygon contour and forms a portion of the circumferential surface of the hole enlargement. This axial portion of the circumferential surface does not encompass the hole enlargement and the coupling surface of the cutting plate encompasses over its full circumference in close contact with the holder a complementary circumferentially closed countersurface of a front-face projection implemented integrally. The cross section encompassed by the coupling surface is greater than the cross section of the screw hole in the holder.

In this alternative embodiment of according to the invention, the projection is not formed on the cutting plate but rather on the holder. The advantage that the coupling surface of the cutting plate and the countersurface of the holder are present on the full circumference also applies here. The remaining advantages such as high run-out and concentricity properties as well as exact centering, retained even under load, are also obtained.

A further development of this alternative consists in that the cutting plate has an annular wall dividing its through hole into three axial sections, which wall forms a cylindrical central hole section which is adjoined on one side by the hole enlargement and on the other side, forming a planarly ground radial annular shoulder face, by a hole section comprising the coupling surface, and that the annular shoulder face forms an axial support face for the front face of the hole which is also planarly ground.

An alternative further development of the invention in which such annular shoulder face is not present, consists therein that the coupling surface extends to the hole enlargement and that this has a radius at least equal to the greatest vertex radius of the coupling surface contour and that between the hole enlargement and the coupling surface several sickle-shaped contact shoulder faces distributed over the circumference are formed for supporting the head of the screw. This implementation makes possible placing the coupling surface on a mean diameter of maximum size.

For all embodiments of the invention an advantageous further development is that the arcuate polygon contour of the coupling surface is composed of a number of circular cylindrical arcuate sections of large diameter and an equal number of circular cylindrical arcuate sections of smaller diameter of which each is connected, forming continuous transitions, with two sections of large diameter. The coupling surface consequently has no corners, rather these are rounded through the arcuate sections of small diameter. A multicorner polygon contour encompasses triangle, square and also multicorner polygon profiles and it is understood that the convex polygon and concave polygon contours defined in the claims include also those in which the radii of curvature of the arcuate sections of large diameter are not limited upwardly so that at least approximately planar coupling surface sections are comprised within the scope of the protection.

It is also understood that the coupling surface contour does not need to form the exact complement of tile countersurface contour but rather for particular cases of loading and radii of arc of the polygon contours it is even advantageous to ensure in the region of the arcuate sections of smaller diameter a gap expansion between coupling surface and countersurface in order to minimize thereby notch stresses.

The drawing illustrates embodiment examples of the invention.

BRIEF DESCRIPTION OF THE DRAWING

In the drawings is:

FIG. 1 is an exploded view of a cutting tool with cutting plate, holder and fastening screw, FIG. 2 is a front frontal view onto the tool in the assembled state, FIG. 3 is a rear view of the cutting tool.

DESCRIPTION OF THE PREFERRED EMBODIMENTS

Figure 4:
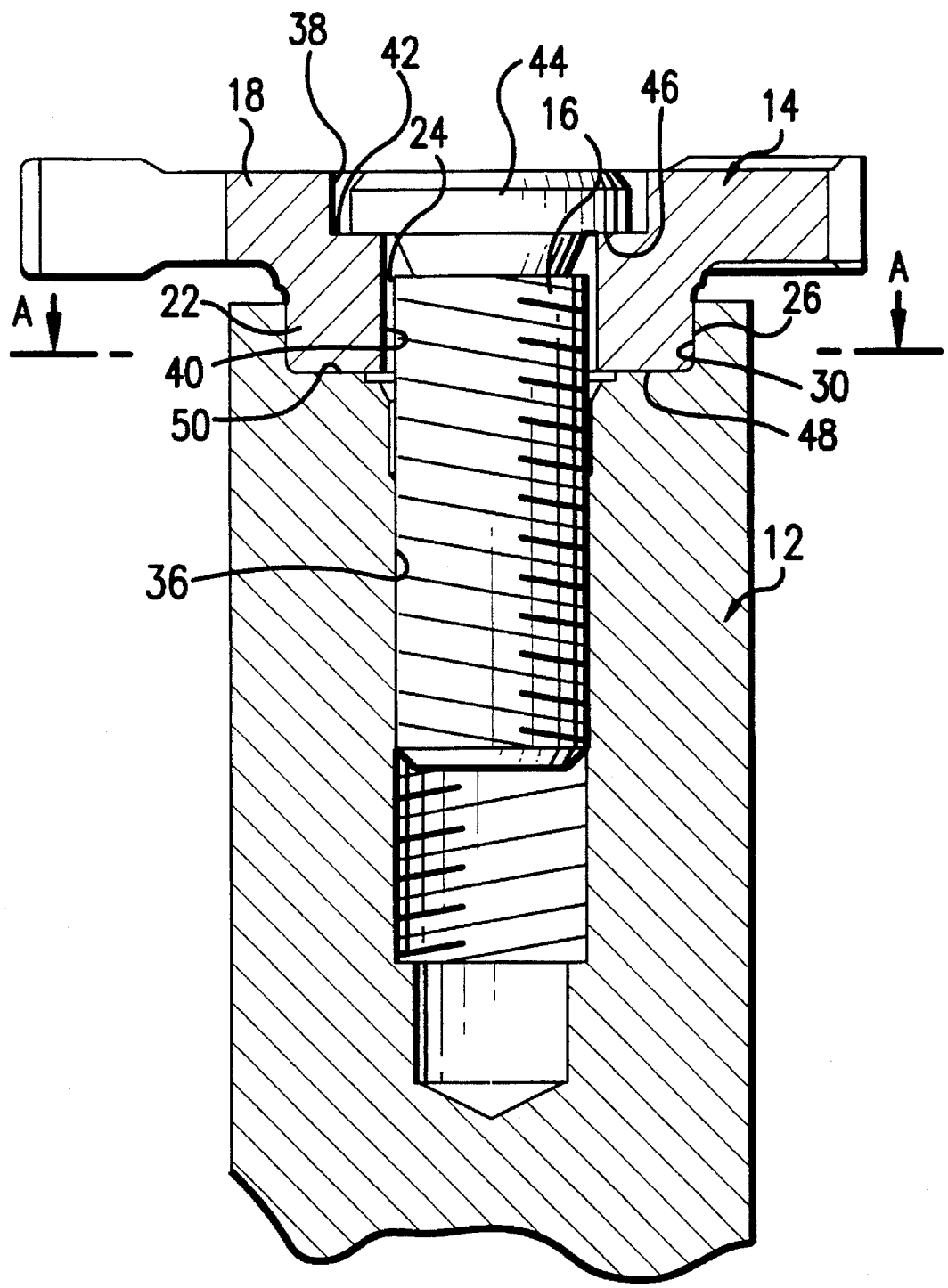
FIG. 4 is an axial section through the cutting tool on an enlarged scale.
Figure 5:
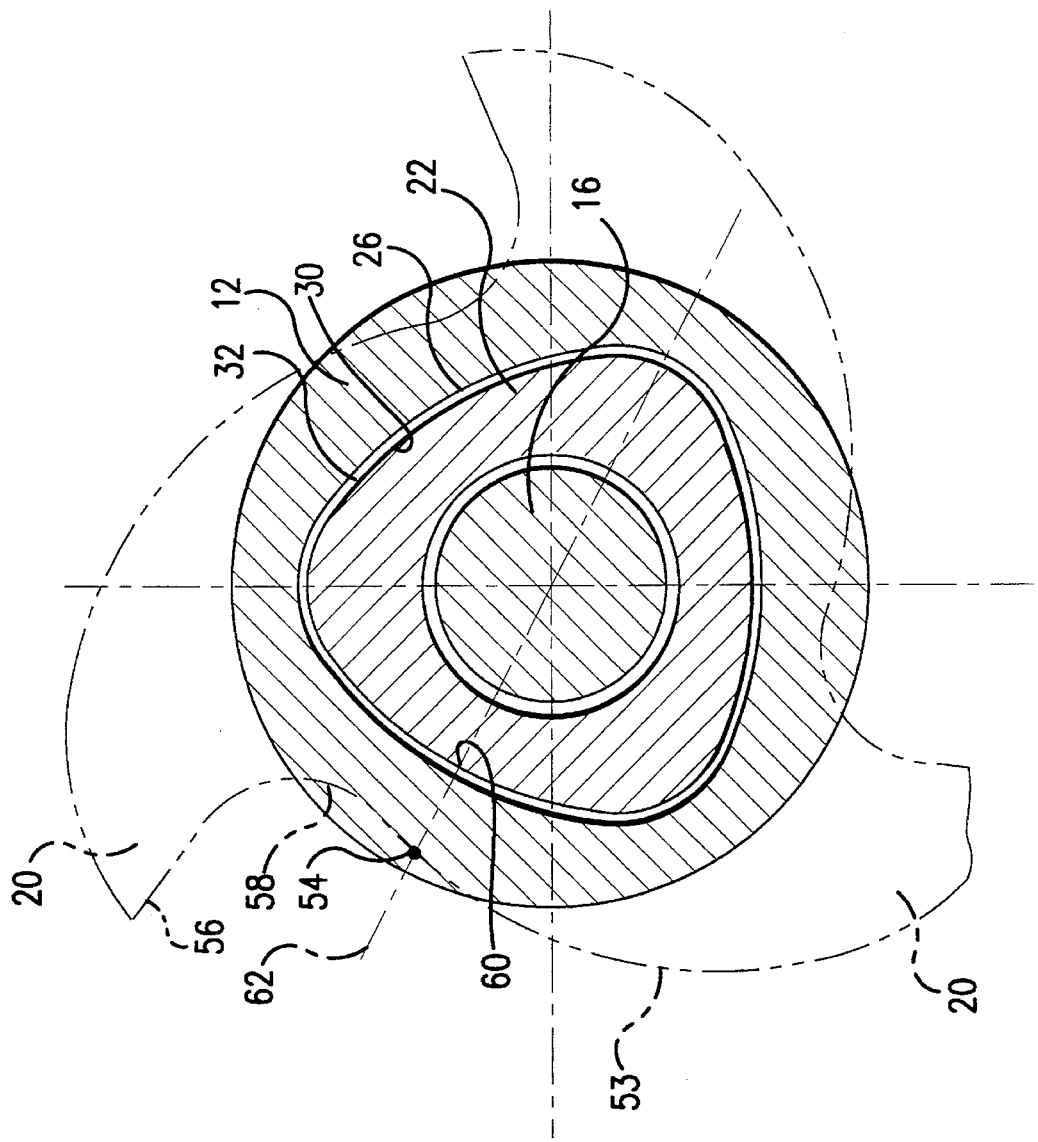
FIG. 5 is a cross sectional view of the cutting tool along line A—A of FIG. 4 in the no-load state.
Figure 6:
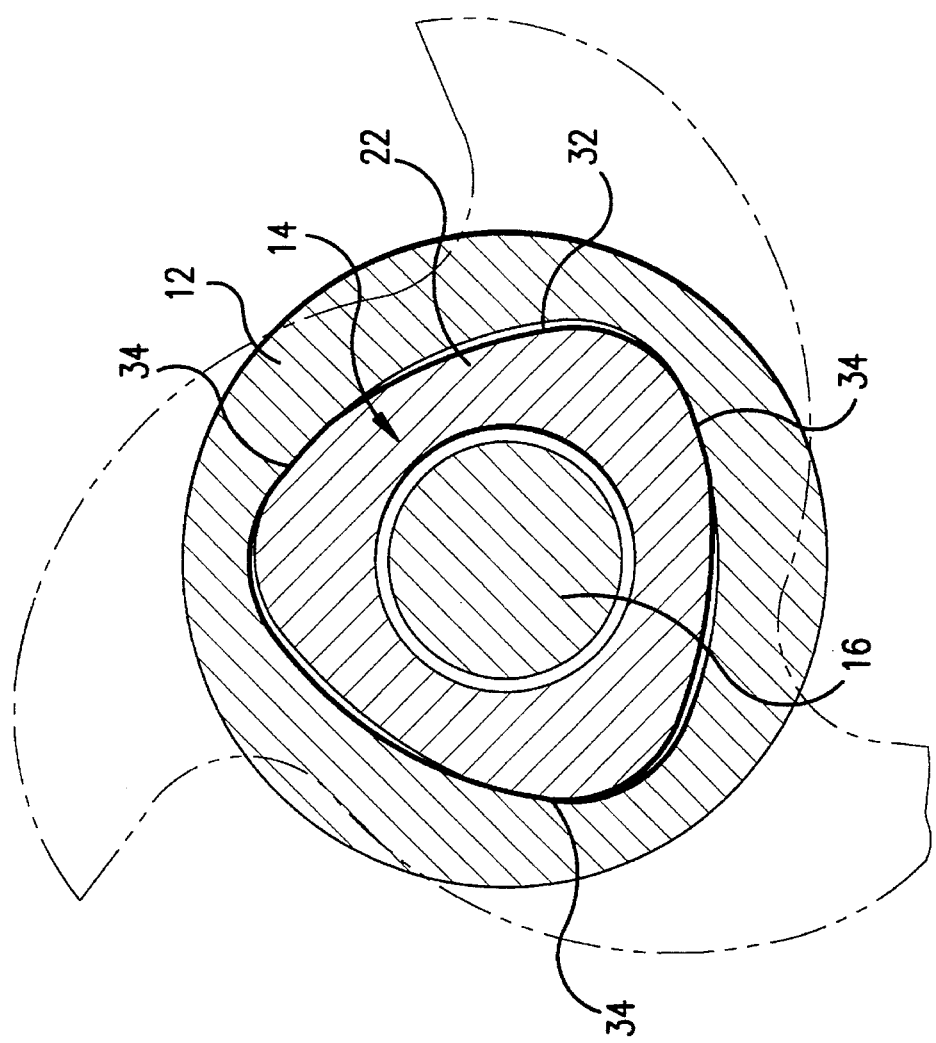
FIG. 6 is a cross sectional view similar to FIG. 5, however, in the loaded state.

A cutting tool 10 comprises a holder 12, a cutting plate 14 and a fastening screw 16. The cutting plate 14 is composed of a disk-shaped body 18 with three teeth 20 and a projection 22 formed integrally during the original formation. A through hole 24 penetrates the entire cutting plate 14, thus extends through the disk-shaped body 18 and the projection 22. Projection 22 has a coupling surface 26 which is exactly at right angles to the front face 48 of projection 22 and has the contour of a triangular convex polygon. The holder 12 has a front-face recess 28 which is encompassed all around by a wall ring of holder 12. This recess 28 has a countersurface 30 which has a triangular concave polygon contour which is implemented precisely complementarily to that of projection 22. Both faces 26, 30 are coaxial with the axis of holder 12 and the cutting plate 14. The polygon contour is composed of three circular arcs of small diameter and interspaced and seemlessly adjoining circular arcs of large diameter. Between the two surfaces 26, 30 an annular gap 32 is formed which when no load is placed on the cutting tool has a constant gap width (FIG. 5). In the loaded state (FIG. 6) motion of the cutting plate 14 relative to holder 12 takes place and three contact zones 34 of considerable circumferential extend are formed. The coaxiality of cutting plate 14 and holder 12 is retained through the self-centering effect of the triangular polygon.

The through hole 24 is stepped and has a circular cylindrical hole enlargement 38 of greater diameter which is mainly assigned to the disk-shaped body 18 and serves for receiving the head 44 of screw 16, as well as a hole section 40 of smaller diameter which is assigned mainly to projection 22. Between them is formed an annular shoulder 42 lying in a radial plane which supports a radial annular face 46 of the screw head 44. Between head 44 and hole enlargement 38, on the one hand, and the adjoining shaft of the fasting screw 16 and the bore section 40, on the other, obtains a radial interval which ensures that the fastening screw 16 is without any centering function. The form-fit connection between cutting plate 14 and holder 12 is formed exclusively through projection 22 of the cutting plate 14 and the front-face recess 28 in holder 12. The radial form fit is ensured by the coupling surface and the countersurface 26, 30 and the angular position ensures the planar faces 48, 50, ground exactly at right angles to the axes of cutting plate 14 and holder 12, of projection 22 and front-face recess 28. The axial support of the cutting plate 14 takes place exclusively in the region of projection 22, thus in the central region of cutting plate 14. Projection 22 is longer than recess 28 is deep so that the cutting plate 14 with its teeth 20 and in the annular region, adjoining the teeth, of the disk-shaped body 18, is at an axial distance from the front face of holder 12.

Figure 7:
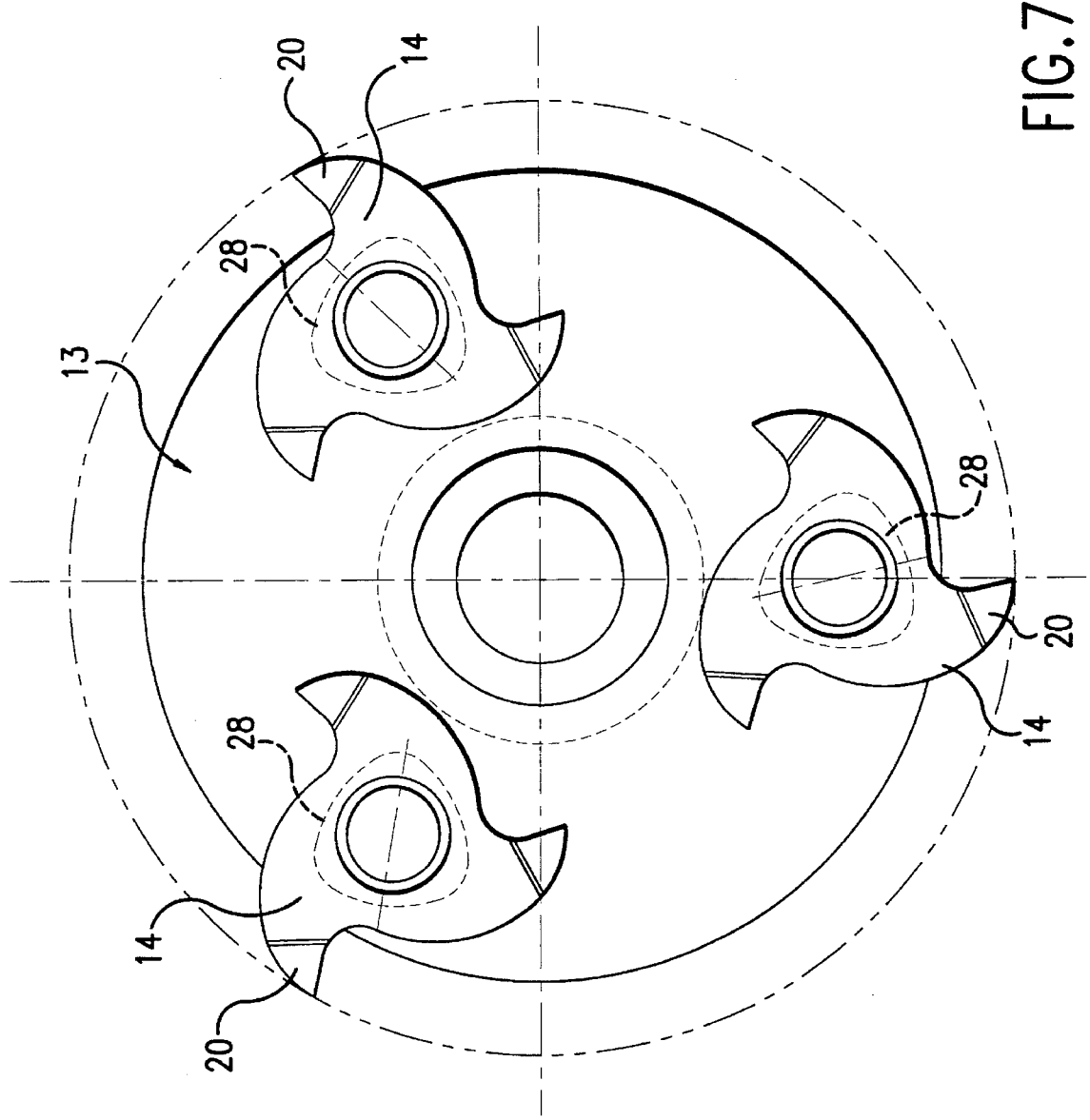
FIG. 7 is a frontal view of a cutting tool with a plate-like head, on which several cutting plates are fastened eccentrically.

FIG. 7 illustrates a plate-like head 13 of a cutting tool comprising front-face recesses 28 depicted in its front face in dashed lines at an angular distance of 120°. Into each of these is inserted a cutting plate 14 with its triangular polygon projection 22, as described above. One cutting tooth 20 projects radially over the circumference of head 13. The cutting tooth 20 is disposed at an axial distance from the front face of head 13. The cutting plate 14 here forms reversing cutting plates.

As is evident in FIG. 5, the rounded "corners" of the polygon coincide with the median line between the points at which the front face 56 and the rear face 53 of each tooth 20 intersect the contour of holder 12. The site 54, at which the convexly arched rear face 53 of each tooth 20 changes over into the concave transition face 58 leading to the front face 56 of the adjacent tooth 20, consequently, lies in each instance with site 60 of least radial extent of the triangular convex polygon in the same radial plane 62.

Figure 8:
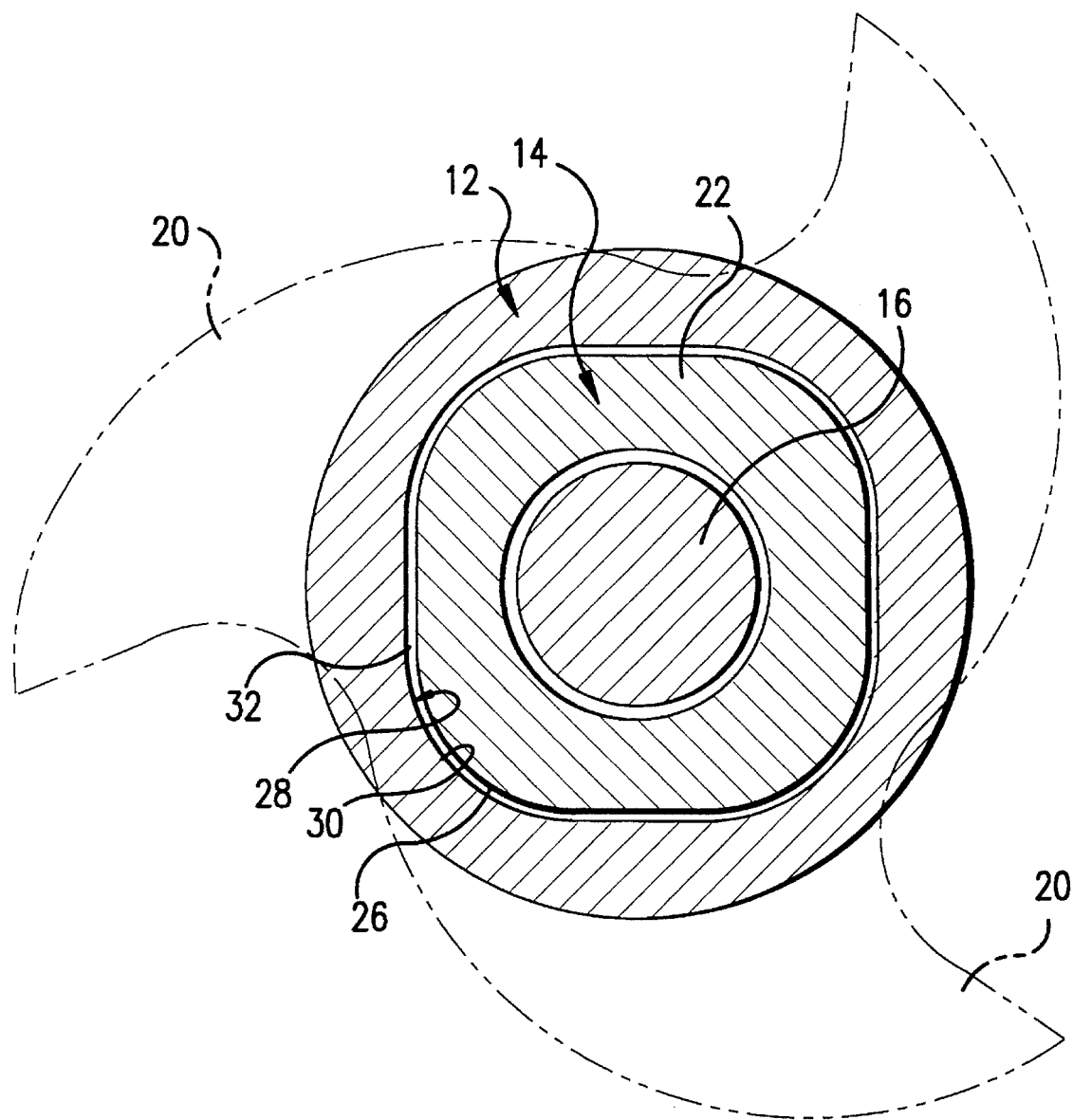
FIG. 8 is a cross sectional view similar to FIG. 5, however, through a rectangular polygon receiver.
Figure 9:
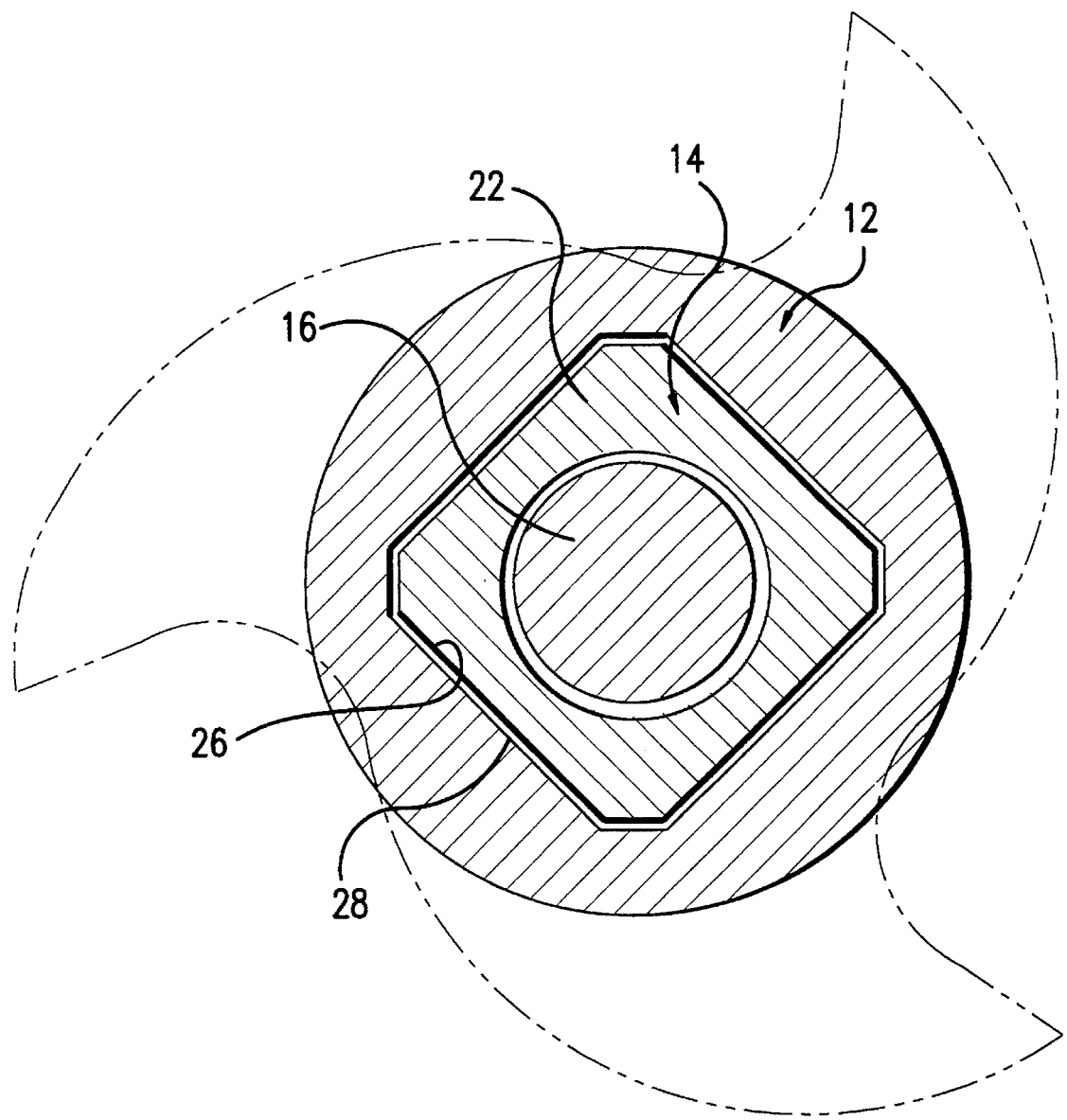
FIG. 9 is cross sectional view of a further modified polygon profile.

FIGS. 8 and 9 depict cross sections of two rectangular polygon couplings of a cutting plate 14 with a holder 12 also in plane A—A of FIG. 5. The coupling surface 26 of projection 22 is composed of four convexly arched surface sections with large radius of curvature and four surface sections with small radius of curvature. All surface sections change continuously and edge-free over into one another.

In contrast to FIG. 8, FIG. 9 depicts a profile for a rectangular polygon coupling. Between each longer surface section of large diameter and a shorter surface section also of large diameter, a short transition zone with small diameter is formed which in the present representation appears nearly as an edge.

Figure 10:
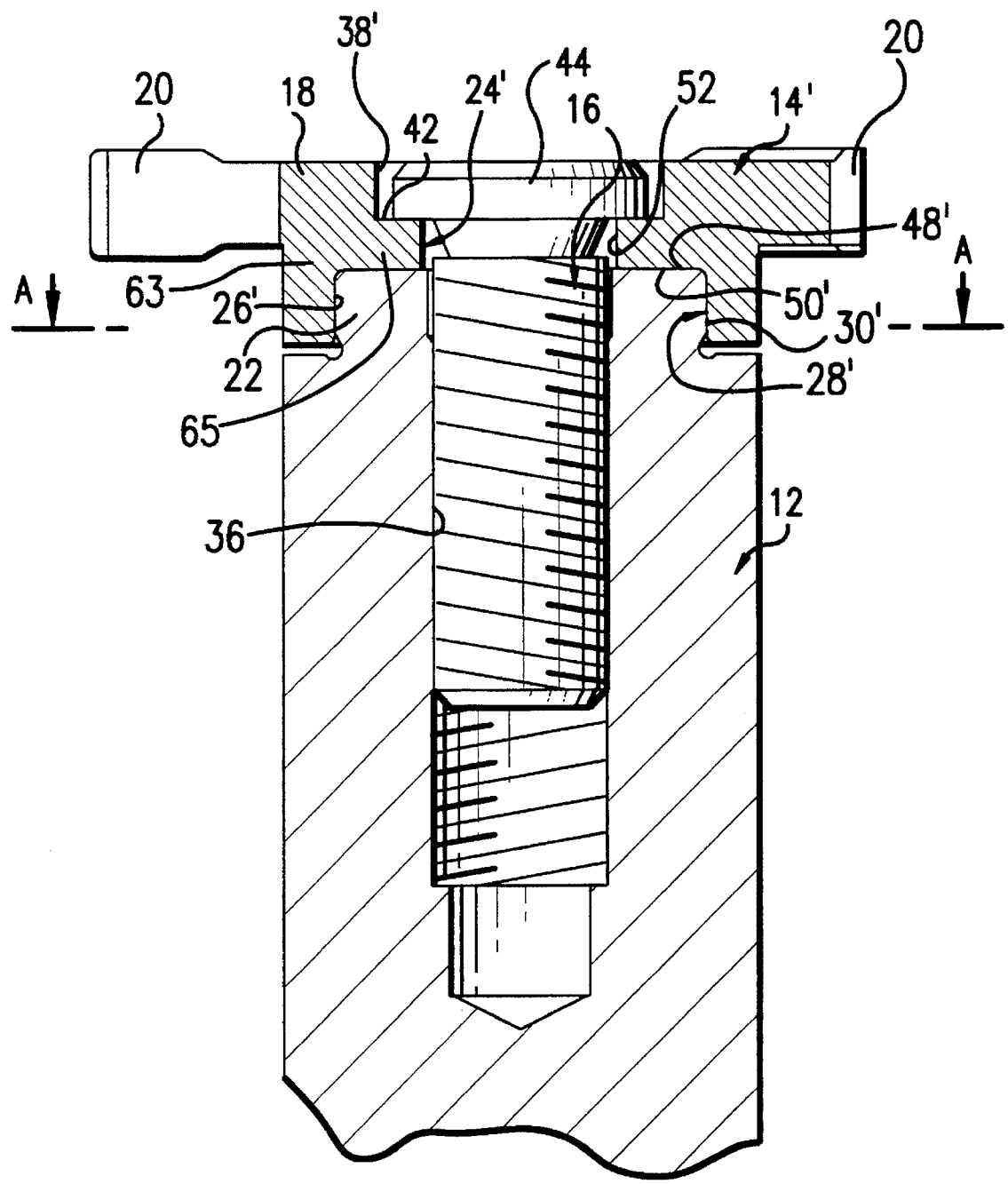
FIG. 10 is an axial section similar to FIG. 4, however, through a variant.

FIG. 10 shows an axial section through a modified cutting tool in which projection 22' is associated with holder 12' and the complementary recess 28' with cutting plate 14'. The through hole 24' comprises a hole enlargement 38', a central hole section 52, and a recess 28', which forms a collar projection 63 of the cutting plate 14' and whose inner surface comprises the coupling surface 26' with multicorner concave polygon contour according to FIGS. 5, 8 or 9. The bottom face 50' of recess 28' is formed on an annular wall 65 which delimits the central hole section 52. This is adjoined, forming a radial annular face 42', by the hole enlargement 38' for receiving the screw head 44. Between it and the circumference of the hole enlargement 38' as well as between tire screw shaft and the central hole section 52 in each instance a radial interval obtains.

Figure 11:
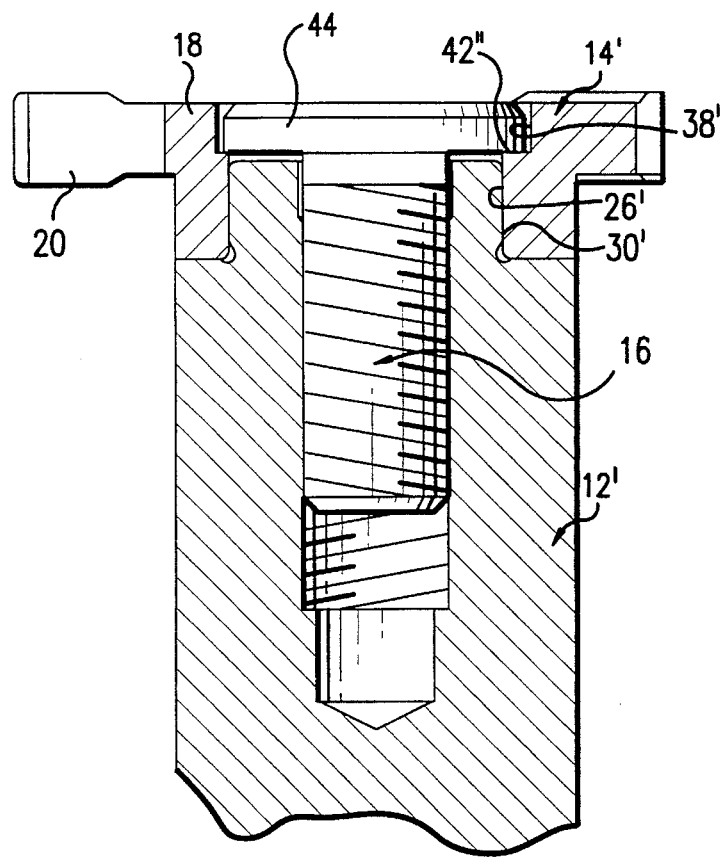
FIG. 11 is an axial section similar to FIG. 10 of a further modification.
Figure 12:
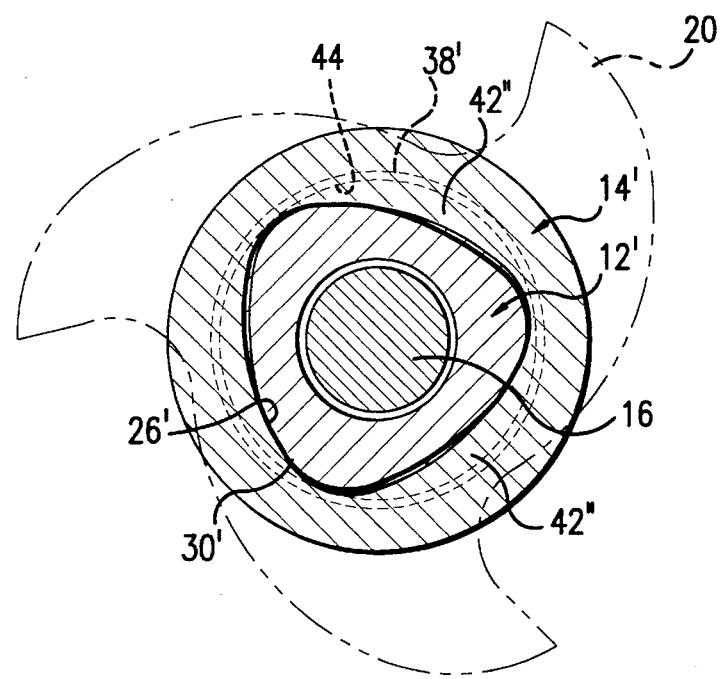
FIG. 12 is a cross section through the cutting tool according to FIG. 11 in the region of the form-fit coupling.

In the embodiment according to FIGS. 11 and 12 the annular wall 65 is not present and recess 28' terminates in the hole enlargement 38' forming contact shoulders 42". The inner radius of tile hole enlargement 38' is equal to the radius at the vertex of the polygon section of small diameter (FIG. 5, 8). The screw head 44 is supported on three (FIG. 5) or four (FIG. 8) sickle-shaped support shoulder faces 42".

Holder 12' according to FIGS. 10 to 12 comprises a projection 22' projecting from its front face, whose cross section has a multicorner convex polygon contour which is complementary to the inner contour of the recess 28'. According to FIG. 10, the projection 22' is slightly higher than the recess 28' is deep. The cutting plate 14' is therefore only supported on holder 12' in the central region but not in the external circumferential region.

The front face 48' of projection 22' is planarly ground and serves in the embodiment according to FIG. 10 as the sole axial seat face for the bottom face 50', also ground planarly, of recess 28' of cutting plate 14'. The front face of the collar projection 63 in that case does not require any working.

In the embodiments according to FIGS. 10–12 it applies also that the cutting teeth 20 and the annular region, adjoining the cutting teeth 20, of the cutting plate 14' have an axial distance from holder 12'. In the event of damage to the cutting plate 14', the plate receiver on holder 12' is not affected.

We claim:

1. A cutting tool comprising:

a cutting plate, having a circumference, a front face and a coupling face opposite the front face;

at least one cutting tooth sintered to the circumference of the cutting plate;

a projection, integrally formed on the coupling face as a seamless homogenous structure, the projection having a first coupling surface forming an outer circumferential surface of the projection, the first coupling surface of the projection having the shape of a rounded multicorner polygon contour, and a second coupling surface formed perpendicular to the first coupling surface;

a central hole through said cutting plate and the projection, the central hole having a first radius adjacent the front face of the cutting plate of greater length than a length of a second radius within the projection;

a holder, having a second front face defining a recess having an inner circumferential surface with a shape approximately complimentary to the first coupling surface of the projection;

a radial face formed in the recess perpendicular to the inner circumferential surface, the radial face delimiting a depth of the recess, the depth of the recess being less than a height of the projection;

an axial bore defined within the holder extending inward from the radial face of the recess, a third radius of the bore being smaller than the second radius of the central hole; and a head screw, screwed into said bore through said central hole of said cutting plate, fastening the cutting plate to the holder such that the second coupling surface of the projection is in contact with the radial face of the recess.

2. A cutting tool according to claim 1, wherein the first coupling surface comprises a first plurality of circular cylindrical arcuate sections having a first diameter; and a second plurality of substantially circular cylindrical arcuate sections having a second diameter smaller than the first diameter, the number of second sections being equal to the number of first sections, and each of the second plurality of sections is connected between two of the first plurality of sections, thereby forming a continuous surface.

3. A cutting tool, comprising:

a cutting plate, having a circumference, a front face and a coupling face opposite the front face;

at least one cutting tooth sintered to the circumference of the cutting plate;

a first cylindrical coupling surface defining a recess in the coupling face, the first coupling surface having a rounded multicorner inner polygon shape;

a second coupling surface perpendicular to the first coupling surface, defining a depth of said recess;

a central hole through said cutting plate, the central hole having a region adjacent the front face of the cutting plate with a first radius of greater length than a length of a second radius of a second region adjacent the second coupling surface;

a holder having a second front face;

a projection formed integrally on the second front face, the projection having a polygonal countersurface shaped at least approximately complimentary to the first cylindrical coupling surface, a radial face perpendicular to the polygonal countersurface, and a distance between the second front face and the radial face being greater than the depth of the recess;

an axial bore through the holder, extending inward from the radial face of the projection, and having a third radius which is smaller than the second radius of the central hole; and a head screw, screwed into said bore through said central hole of said cutting plate, fastening the cutting plate to the holder such that the second coupling surface of the recess is in contact with the radial face of the projection.

4. A cutting tool according to claim 3, wherein the second region is formed by a plurality of sickle-shaped support shoulders having faces extending from the cutting plate within the central hole, each support shoulder face having top and bottom surfaces, the plurality of support shoulders distributed around the circumference of the central hole, whereby the head screw is supported on the top surfaces of the plurality of support shoulders, and the bottom surfaces comprise the second coupling surface.

5. A cutting tool according to claim 4, wherein the first coupling surface comprises a first plurality of circular cylindrical arcuate sections having a first diameter; and a second plurality of substantially circular cylindrical arcuate sections having a second diameter smaller than the first diameter, the number of second sections being equal to the number of first sections, and each of the second plurality of sections is connected between two of the first plurality of sections, thereby forming a continuous surface.

6. A cutting tool according to claim 13, wherein the first coupling surface comprises a first plurality of circular cylindrical arcuate sections having a first diameter; and a second plurality of substantially circular cylindrical arcuate sections having a second diameter smaller than the first diameter, the number of second sections being equal to the number of first sections, and each of the second plurality of sections is connected between two of the first plurality of sections, thereby forming a continuous surface.

7. A cutting tool, comprising:

a cutting plate, having a circumference, a front face and a coupling face opposite the front face;

at least one cutting tooth sintered to the circumference of the cutting plate;

an annular projection integrally formed on the coupling face;

a first cylindrical coupling surface defining an inner surface of the annular projection, the first coupling surface having a rounded multicorner inner polygon shape;

a second coupling surface perpendicular to the first coupling surface, a distance between the coupling face and the second coupling surface defining a length of the annular projection a central hole through said cutting plate, the central hole having a region adjacent the front face of the cutting plate with a first radius greater than a second radius of a second region adjacent the coupling face;

a holder having a second front face;

a second projection formed integrally on the second front face and perpendicular to the second front face, the second projection having a polygonal countersurface shaped at least approximately complimentary to the first cylindrical coupling surface, a radial face perpendicular to the polygonal countersurface, and a distance between the second front face and the radial face being less than the length of the annular projection formed on the coupling face;

an axial bore through the holder, extending inward from the radial face of the second projection, and having a third radius which is smaller than the second radius of the central hole; and a head screw, screwed into said bore through said central hole of said cutting plate, fastening the cutting plate to the holder such that the second coupling surface of the annular projection is in contact with the second front face of the holder.

8. A cutting tool according to claim 7, wherein the first coupling surface comprises a first plurality of circular cylindrical arcuate sections having a first diameter; and a second plurality of substantially circular cylindrical arcuate sections having a second diameter smaller than the first diameter, the number of second sections being equal to the number of first sections, and each of the second plurality of sections is connected between two of the first plurality of sections, thereby forming a continuous surface.

9. A cutting tool according to claim 7, wherein the second region is formed by a plurality of sickle-shaped support shoulders having faces extending from the cutting plate within the central hole, each support shoulder having top and bottom surfaces, the plurality of support shoulders distributed around the circumference of the central hole, whereby the head screw is supported on the top surfaces of the plurality of support shoulders, and the bottom surfaces comprise the coupling face.

10. A cutting tool according to claim 9, wherein the first coupling surface comprises a first plurality of circular cylindrical arcuate sections having a first diameter; and a second plurality of substantially circular cylindrical arcuate sections having a second diameter smaller than the first diameter, the number of second sections being equal to the number of first sections, and each of the second plurality of sections is connected between two of the first plurality of sections, thereby forming a continuous surface.

* * * * *